United States Patent [19]
Van der Wiele

[11] 4,238,235
[45] Dec. 9, 1980

[54] PROCESS FOR STABILIZING HYDRAULIC BINDING AGENT AND BRIQUETTES PREPARED THEREFROM

[76] Inventor: Gerrit Van der Wiele, Beukstraat 135, The Hague, Netherlands

[21] Appl. No.: 943,911

[22] Filed: Sep. 19, 1978

[51] Int. Cl.³ .............................................. C04B 7/02
[52] U.S. Cl. ..................................................... 106/89
[58] Field of Search ........................... 106/64, 89, 102

[56] References Cited
U.S. PATENT DOCUMENTS

| | | | |
|---|---|---|---|
| 944,692 | 12/1909 | Pope | 106/64 |
| 2,083,180 | 6/1937 | Work | 106/64 |
| 2,221,175 | 11/1940 | Bechtold | 106/89 |

*Primary Examiner*—James Poer
*Attorney, Agent, or Firm*—Wilkinson, Mawhinney & Theibault

[57] ABSTRACT

A process is disclosed for uniformly blending a hydraulic cement binding agent with a liquid stabilizing agent following which the blend is compacted into moulded configurations which stabilizes the hydraulic cement binding agent against deterioration during storage and shipment. When the moulded configurations are ready for use, they are pulverized or formed into aggregates and processed into concrete by conventional techniques.

2 Claims, No Drawings

PROCESS FOR STABILIZING HYDRAULIC BINDING AGENT AND BRIQUETTES PREPARED THEREFROM

BACKGROUND OF THE INVENTION

The present invention relates to a process for uniformly blending a hydraulic cement or similar powder binding agent with a liquid stabilizing agent and to moulded configurations prepared with the blend. The moulded configurations are found to be highly stable against deterioration which normally affects hydraulic cement or similar powder binding agents.

Hydraulic cement of the general type which serves as binding agents for particulate materials in concrete or the like, may be prepared by burning either an argillaceous limestone, or a limestone interground with special portions of clay or shale. After being kiln processed prepared, the powdered cement must be used while fresh or otherwise special conditioning must be assured to avoid the art recognized disadvantage of limited tenability.

Even within periods of time such as three months, cement tends to deteriorate such that when it is used as a binding agent in concrete, an inferior product is found to result. This tendency to deteriorate renders powdered cement unsuitable for transportation either in bags or bulk over long distances or for extended periods of time.

In addition to the expense of packaging cement in bags, there is also the problem of breakage when bags are stacked in high layers, coupled with the problems of transport and breakage in handling of the bags.

It appears that one factor which causes cement to deteriorate is atmospheric carbon dioxide which tends to react with silicate and aluminate components of the cement, and form products which render the cement useless in preparation of durable concrete.

Another factor which causes cement to deteriorate is atmospheric moisture which tends to prematurely set the cement.

One attempted solution to preserve cement has been to store the cement in specially conditioned rooms.

These specially conditioned rooms are expensive to maintain and are of limited effectiveness due to the fact that the powdered cement contains a high percentage of intermixed air with the cement which results during bagging.

Another attempted solution to preserve cement has been by moulding powdered cement with from about 2 to 5% by weight of water. However, when the moulds are pulverized, it is found that very fine cement particles such as 1 to 5 mm diameter become water reacted and bind together prematurely. Thus, this reacted particles no longer usefully serve in the preparation of concrete.

It is found that after pulverization of these water conditioned cements, the resultant powders have decreased strength properties when processed into concrete as opposed to the original starting material. An analysis of the pulverized cement to its original fineness shows that by using water as a binding agent during compressing, the loss of ignition will raise from above the 5%, a level which has been considered in the art to be unacceptable. Typically, in the cement processing art, the maximum figure for loss of ignition is fixed between 3 to 5%.

It has now been found however, that by practice of the present invention, the difficulties and disadvantages of prior art attempts to stabilize cement from deterioration have been overcome in a simple, highly efficient manner.

SUMMARY OF THE INVENTION

The present invention, generally stated, relates to a process for stabilizing either cement or related binding agents from deterioration by blending with a stabilizing agent following which the blend is compacted into moulded configurations. When the moulded configurations are ready to be compounded into a concrete formulation, they are simply pulverized before being combined with water and particulate materials.

It is an object of this invention to stabilize powdered cement or related binding agents from deterioration.

It is also an object of this invention to provide new improved briquettes by compacting a blend of a hydraulic cement powder and stabilizing agent.

It is another object of the present invention to encapsulate particles of hydraulic cement powder with a stabilizing agent and thereby retard deterioration caused by atmospheric moisture and carbon dioxide.

It is yet another object of this invention to render cement suitable for long periods of transportation or storage without adversely affecting the quality thereof.

These objects as well as additional objects and advantages will become more apparent from the following more detailed description of the preferred embodiments.

DETAILED DESCRIPTION OF THE PREFERRED EMBODIMENTS

Practice of the present invention provides a process and moulded configurations such as briquettes whereby cement may be effectively stabilized against deterioration. And although the description hereof is made with reference to hydraulic cement, it will be appreciated that binding agents generally may be stabilized including materials used in construction such as plasters, Portland cement, and the like, by way of non-limiting example.

Althouh not intending to be bound by the theory of how the present invention accomplishes stabilization, it appears that when the stabilizing agent coates particles of the cement, a slight pre-hydration is effected which coupled with the coating acts as a barrier against contact of the contained cement and atmospheric substances such as moisture and carbon dioxide which are responsible for cement deterioration.

The stabilizing agent of the present invention may be a material which coates particles of the cement such that a barrier is provided between the contained cement and elements such as carbon dioxide and water which normally contribute to deterioration. Preferably the stabilizing agent is one which contains a calcium sulfate modification such as gypsum or the like. Calcium sulfate dihydrate ($CaSO_4.2H_2O$) is also usefully employed. Although somewhat less effective than calcium sulfate, phosphoric acid may also be used.

Calcium sulfate may be added as the anhydrite as the partially hydrated calcium sulfate ($CaSO_4.\frac{1}{2}H_2O$) or as the calcium sulfate dihydrate ($CaSO_4.2H_2O$). During briquetting or moulding under pressure, it is found that the anhydrite or partially hydrated forms of calcium sulfate are transformed to the dihydrate form of the salt.

Preferably a saturated solution of the stabilizing agent is added to the cement as a saturated solution in an amount of about 1 to 5% by weight and preferably from about 2 to 4% by weight. In order to more effectively coat the cement particles, a liquid is combined with the stabilizing agent when it appears as a powder to serve as a vehicle for encapsulating the cement and adhering thereon as a coating. A number of liquids may be used herein but as a practical matter and because of its relatively inexpensiveness and abundancy, water is preferred as the liquid vehicle, the more so as it provides a slight prehydration of the cement.

The powdered cement may be added to a suitable mixing unit such as a kneading mixer for effecting coating of particles with the stabilizing agent. The solution of the stabilizing agent may be added by any suitable means with spraying being especially desirable since homogeneous mixing is more easily accomplished. After the blending and coating or encapsulation of the cement particles with the stabilizing agent has been effected, the coated particles are compressed into a larger mass such as in the shape of briquettes or other conveniently moulded configurations. The briquettes or moulded configurations are found to be storage stable and when it is desired to prepare concrete, the briquettes are pulverized or aggregated and processed into concrete by conventional techniques.

In the process of compressing a powdered cement binding agent, it appears that a slight pre-hydration occurs by addition of the liquid as a component of the stabilizing agent and thereby forms a barrier which retards deterioration of the contained cement. It is recommended to add to the cement less than 10% of water in the form of an aqueous solution saturated with a stabilizing agent.

Tests and research show that by compressing or briquetting the presently processed cement binding agent into moulds, there results a product having a Blaine (ASTM, Bull. No. 108, 17–20 (1941)) surface area of 5,000 sq. cm./gram and higher.

The freshly processed blend of cement and stabilizing agent may be moulded in a briquette press, either continuously by roll techniques or by stamp pressing at a pressure which varies from about 500 to 1500 kg./cm$^2$.

The following examples illustrate practice of the present invention in greater detail. In the examples, as well as in the specification generally, all parts are given by weight unless otherwise indicated.

EXAMPLE I 1.000 kg of blast furnace cement containing known additives and having a Blaine surface of 3.000 sq. cm./gm. was added to a rotating kneading mixer. During rotation, 30 kg. of an aqueous gypsum dihydrate saturated solution was sprayed into the cement and mixing is continued until a uniform blend was prepared. The uniform blend of cement and the aqueous gypsum saturated solution was compressed into briquettes at a pressure of 1.000 kg./cm$^2$. When tested, the briquettes were found to have a shear-strength of about 400 to 500 kg./cm$^2$. The loss of ignition of the cement after pulverization of the briquettes was about 3% which was well within the accepted tolerance of 5%. By spraying an aqueous gypsum dihydrate saturated solution, it was found that the cement parts were essentially equally encapsulated with gypsum dihydrate and no undesirable binding of the fine parts were found to occur. Briquettes stored for periods in excess of six (6) months were found to have the original Blaine when pulverized and usefully served to form a durable concrete when combined with water and particulate materials. In the preceding and further parts an aqueous gypsum dihydrate saturated solution is obtained by saturating water with dissolved $CaSO_4.2H_2O$ and using this aqueous solution for spraying. An easy way of preparing this saturated solution is mixing excess $CaSO_4.2H_2O$ with water so that undissolved $CaSO_4.2H_2O$ remains and the upper liquid layer is a saturated gypsum dihydrate solution.

EXAMPLE II

The procedure of Example I was repeated by spraying 2% of the aqueous solution saturated with dissolved $CaSO_4.2H_2O$ onto the cement. In order to obtain a good and homogeneously moistening, the gypsum-dihydrate saturated aqueous solution is subjected to a magnetic field. The briquettes were found to have a strength of about 200 to 300 kg/cm$^2$.

EXAMPLE III

The procedure of Example I was repeated by spraying 5% of an aqueous solution saturated with dissolved $CaSO_4.2H_2O$. The briquettes were found to have a shear-strength of about 500 to 600 kg/cm$^2$ and the quality of the cement, after pulverization of the briquettes remained good although use of 3% of the aqueous gypsum saturated solution was found to be optimum.

EXAMPLE IV

The procedure of Example I was repeated except using 1% phosphoric acid solution in stead of the aqueous gypsum saturated solutions. Although the briquettes of this example were not as stable as those prepared in Example I, nevertheless stabilization of the concrete against deterioration was found to have taken place.

EXAMPLE V

Concrete mortar was prepared using 300 kg ordinary Portland cement obtained by pulverizing briquettes as prepared according to Example I. 690 Kg. normal sand, 150 liters water, 1165 kg of briquettes obtained by the procedure of Example I. However, instead of cement a mixture of equal parts of Portland cement and finely divided mine stone is used for preparing the 1165 kg of briquettes, and these briquettes are broken to the size of normal gravel so that these particles act as artificial gravel. The 300 kg cement binds roughly 75 liters water ($0.25 \times 300$), so that 75 liters of excess water exist. These 75 liters of water are hydraulically bound by the 1165 kg of cement briquettes broken to the size of normal gravel. In this way a substantially pore free concrete such as required for nuclear reactor constructions can be obtained.

If in stead of the broken briquettes normal gravel is used, the excess of water which has not been bound by the cement must be removed by evaporation and this involves the formation of many pores, thus impairing the strength.

By applying the articles according to the invention the porosity is decreased with 40%.

Advantageously the mixture for preparing artificial gravel comprise 30–70% of cement and 70 to 30% of filler materials, such as mine stone. Preferably 40–60% of cement and 60–40% of filler materials, and more preferably 50% of cement and 50% of filler material is used for the artificial gravel.

Obviously the artificial gravel or artificial sand can also be obtained from the briquettes according to Example I and broken to the size of normal gravel or sand.

By practice of the present invention, it is found that a cement binding agent may be prepared which obviates the necessity to package the cement in specialized bags. Also, the need to transport or contain the present cement in a specially conditioned environment is no longer necessary.

The briquettes are found not only to limit the influence of moisture and carbon dioxide on deterioration but also there is the benefit of not having a significant loss of ignition either by prolonged storage or delayed shipment.

Another benefit found by processing the present cement into concrete is that it can also serve as an auxiliary material to conventional cement. In this capacity, there is a tendency for the presently processed cement to influence the hardening process of concrete when processed along with conventional cement. Thus, the present briquette may be pulverized and added along with materials which serve to either accelerate or delay concrete hardening.

It is also possible to grind the present briquettes to the size of sand and/or gravel and use the resultant particles either as partial or total substitutes for sand or gravel additions in concrete formation. This is especially significant in areas where bans are being imposed on mining of sand or gravel.

It is also found that reduction of the surface tension of the liquid tends to improve the blending of the stabilizing agent. It is also found that the surface tension may be reduced either by special additions which are known to reduce surface tension properties, or alternatively, the liquid may be passed through a magnetic field. This reduction of surface tension tends to improve the coating or encapsulation of the cement particles by the stabilizing agent.

In the preparation of concrete, approximately one part of cement is combined with about two parts of sand and three parts gravel. Water is added in excess for providing a good workable mixture. Since approximately only half of the water is actually used in conventional cement processing, the excess addition eventually has to be removed from the mixture by evaporation by resultant loss of strength in the finished product due to the creation of pores.

In contrast, when the present cement is blended into standard formulations, there is a tendency for the present aggregates to bind the surplus water and thereby prepare a concrete having excellent properties such as being fully water repellant, impervious to aggressive elements and compounds, and impervious to strong climatic changes.

In addition to the properties noted for processing cement by the present invention, it is found that the briquettes are handled as semi-manufactured articles falling under lower tax provisions, the briquettes are easier to transport, they are subject to continuous production and may be used for example, during winter or storm periods. The quality of the briquettes is high and uniform. Furthermore, no special facilities are required for transportation over long distances or storage over long periods. There is no difficulty encountered by damage in shipment since bulk cargo conditions may be used. Also, because the cement is contained, there is no likelihood of environmental dust problems either in shipment or during storage and use. All that is required is a simple grinder at the site of usage to form either aggregates or pulverization of the briquettes and the cement is then ready to be formulated into concrete.

From the foregoing, it will be readily apparent to those skilled in the art that various modifications and changes may be effected herein without departing from practice of the presently disclosed invention.

What is claimed is:

1. A compressed article of cement comprising particles of a powdered cement binding agent which are coated and pressed together with a 1 to 5% of a saturated solution of hydrated calcium sulphate which delays deterioration by moisture carbon dioxide or the like.

2. A compressed article as claimed in claim 1 wherein said article is shaped as a briquette for storage and transport.

* * * * *